United States Patent [19]
Bechtel et al.

[11] Patent Number: 5,165,239
[45] Date of Patent: Nov. 24, 1992

[54] WATER AUGMENTED INDIRECTLY-FIRED GAS TURBINE SYSTEMS AND METHOD

[75] Inventors: Thomas F. Bechtel, Lebanon, Pa.; Edward J. Parsons, Jr., Morgantown, W. Va.

[73] Assignee: The United States of America as represented by the United States Department of Energy, Washington, D.C.

[21] Appl. No.: 709,567

[22] Filed: Jun. 3, 1991

[51] Int. Cl.$^5$ .................................................. F02C 1/04
[52] U.S. Cl. ........................................ 60/683; 60/649; 60/674
[58] Field of Search ......................... 60/674, 683, 649

[56] References Cited

U.S. PATENT DOCUMENTS 4,492,085 1/1985 Stahl et al. ........................ 60/683 X
4,922,709 5/1990 Hendriks ............................ 60/683 X Primary Examiner—Allen M. Ostrager
Attorney, Agent, or Firm—David E. Breeden; Stephen D. Hamel; William R. Moser

[57] ABSTRACT

An indirectly-fired gas turbine system utilizing water augmentation for increasing the net efficiency and power output of the system is described. Water injected into the compressor discharge stream evaporatively cools the air to provide a higher driving temperature difference across a high temperature air heater which is used to indirectly heat the water-containing air to a turbine inlet temperature of greater than about 1,000° C. By providing a lower air heater hot side outlet temperature, heat rejection in the air heater is reduced to increase the heat recovery in the air heater and thereby increase the overall cycle efficiency.

10 Claims, 3 Drawing Sheets

WATER AUGMENTED INDIRECTLY-FIRED GAS TURBINE SYSTEMS AND METHOD

BACKGROUND OF THE INVENTION

The present invention relates generally to an indirectly-fired gas turbine system and more particularly to such a system wherein water is injected into the compressed air stream upstream of the air heater to increase the operational efficiency and power output of the turbine system. The United States Government has rights in this invention pursuant to the employer-employee relationship of the U.S. Department of Energy and the inventor.

Gas turbine systems generally fall into two classes with one class being of the direct-fired type wherein a fuel is burned in the presence of compressed air to provide high temperature combustion products which form the motive fluid for expansion in the turbine while the other class is of the indirectly-fired type wherein the compressed air is indirectly heated in an air heater for providing the motive fluid for the turbine. In the indirectly-fired systems, residual heat in the turbine exhaust is recoverable in a combustion chamber downstream of the turbine wherein a fuel such as coal, natural gas, fuel gas, or oil is burned to provide a stream of hot combustion gases for use in the air heater or heat exchanger utilized to heat the compressed air stream used as the turbine driving motive fluid. In an indirectly-fired system, the turbine is not contactable by such combustion products so as to provide operational advantages over directly-fired systems especially in the area where the turbine components are subject to considerable degradation by contact with the combustion products. The indirectly-fired gas turbine system is believed to be particularly advantageous for the utilization of coal or a coal product such as fuel gas as a fuel in the combustion chamber since no combustion products enter the turbine circuit.

Gas turbine systems employing indirect cycle operations have not been previously found to be adequately competitive with the turbine systems using direct cycle operations since metallic-type heat exchangers, as previously known and used for indirectly heating the compressed air, limited the heating of the latter to a maximum temperature of about 800° C. At such a relatively low temperature, the motive fluid for driving the turbine could not provide the level of work required in the turbine to efficiently compete with the direct cycle systems. Recent developments in high-temperature heat exchangers have substantially overcome this temperature limiting obstacle of the earlier heat exchangers so that the compressed air charge can be heated to turbine inlet temperatures in excess of 1,000° C. so as to significantly increase the operating efficiency of the indirect cycle. One such heat exchanger which is suitable for heating the compressed air in an indirect cycle is made up of ceramic tubes as described in U.S. Pat. No. 4,332,295, issued Jun. 1, 1982, to P. G. LaHaye et al. By employing an appropriate bundle of such ceramic heat exchange tubes, the high temperature combustion gases resulting from the combustion of a fuel such as coal, preferably in the presence of the warm air from the turbine exhaust, contact the hot ceramic tubes to indirectly heat the compressed air to a turbine inlet temperature in a range of about 1100° to 1260° C. In as much as the water-augmented indirectly-fired gas turbine system of the present invention, as will be described below, will utilize a heat exchanger of high temperature air heating capabilities such as described in the aforementioned patent for heating the compressed air to a turbine inlet temperature greater than about 1000° C., this patent is incorporated herein by reference.

The utilization of high temperature heat exchangers or air heaters has increased the efficiency of indirect cycle turbine systems to levels favorably comparing with and often more efficient than the direct-fired turbine systems. For example, a coal-fired indirect cycle at typical operating pressures and with the compressed air heated to provide a turbine inlet temperature of 1260° C. would provide a calculated net cycle efficiency in the 32 to 37 percentile range. The addition of a steam bottoming cycle would increase the net efficiency of the system to about 44 to 48 percent. On the other hand, a natural gas-fired direct cycle system using conventional temperatures and pressures would typically provide a net operating efficiency of about 31 percent with the steam bottoming cycle increasing the efficiency to about 46 percent.

SUMMARY OF THE INVENTION

Thus, while a small increase in efficiency is already realized in the use of indirect cycle systems over the direct cycle systems by employing improved heat exchangers such as described above, it is a principle or primary aim of the present invention to even further increase the net efficiency of the indirect cycle system over the levels previously achievable. In accordance with the present invention, water is added or injected into the compressed air stream prior to the latter reaching the heat exchanger to evaporatively cool the compressed air and thereby provide a higher driving temperature across the heat exchanger than previously achievable By so cooling the compressed before the air enters the heat exchanger, a lower heat exchanger hot side outlet temperature is obtained to increase the efficiency of the air heating mechanism. Also, the added water substantially increases the mass flow and specific heat to significantly increase the power output of the turbine. Further, the reduction in compressed air temperature reduces the quantity of air needed to cool turbine components.

Water injection in a direct-fired turbine cycle has been previously utilized to provide control combustion chemistry and an increase in net power since the added water augments the mass flow of fluid provided to the turbine. However, the water injection imposes a substantial penalty on the efficiency of the direct cycle in that only a relatively small portion of the heat of vaporization extracted from the system for the evaporation of the injected water is recoverable. On the other hand, in an indirect cycle the thermodynamics as provided by the indirect heating of the compressed air are such that the vaporization of the water injected upstream of the primary air heater results in an increased cycle efficiency since the water injection makes it possible to recover more heat in the heat exchanger than would otherwise be possible. Thus, the water injection in the indirect cycle increases the efficiency of the air heater as well as providing an increased mass flow so as to substantially enhance the overall efficiency of the cycle.

Generally, the indirectly-fired gas turbine system of the present invention comprises compressor means for compressing air to a selected pressure during which heat is added to the pressurized air. Heat exchange means are adapted to receive a stream of pressurized air from the compression means and indirectly heat the received air to a selected temperature. Means are provided for introducing water into the stream of pressurized air prior to the reception thereof in the heat exchange means for evaporatively cooling the compressed air. Turbine means are adapted to receive a stream of hot pressurized water-containing air from the heat exchange means for expansion in the turbine means. Combustion means are adapted to receive water-containing air discharged from the turbine means. Means provide the combustion means with a combustible fuel for the combustion thereof in presence of the air from the turbine means to provide a stream of hot combustion gases. Means are provided for conveying the stream of hot combustion gases to the heat exchange means for indirectly heating the pressurized water-containing air to the selected temperature.

Sufficient water is introduced into the pressurized air stream to substantially saturate the air and reduce the temperature of the compressed air to a temperature slightly above the adiabatic saturation temperature of the air. The hot combustion gases are at a temperature in the heat exchange means sufficient to heat the pressurized water-containing air to a turbine inlet temperature greater than about 1,000° C. Further heat exchange means are adapted to receive the combustion gases from the first mentioned heat exchange means for heating the water prior to the introduction thereof into the pressurized air stream.

In the operation of the indirectly-fired gas turbine system of the present invention, the operational steps comprise: compressing air to a selected pressure; adding water to a stream of the compressed air for evaporatively cooling the compressed air; indirectly heating the stream of the compressed water-containing air; conveying a stream of the heated water-containing compressed air into turbine means for driving said turbine means; using a stream of water-containing air from the turbine in combustion means to provide a stream of combustion gases at a temperature greater than that provided to the stream of compressed water-containing air during the indirect heating step; and using the exhaust stream of combustion gases for the step of indirectly heating the stream of the compressed water-containing air to a turbine inlet temperature greater than about 1,000° C. The water is preferably added to the stream of compressed air under super saturated conditions to cool the stream of compressed air to a temperature slightly above the adiabatic saturation temperature for the compressed air. Also, the temperature greater than about 1,000° C. is preferably a temperature in the range of about 1,100° to 1,260° C.

Another object of the present invention is to utilize in an indirectly-fired gas turbine system a combustion arrangement in which coal or a coal product such as a fuel gas is utilized for providing the combustion gases required in the heat exchanger for indirectly heating the compressed air to the temperature required of the water-augmented indirect-fired system.

Other and further objects of the present invention will become obvious upon an understanding of the illustrative embodiment about to be described or will be indicated in the appended claims, and various advantages not referred to herein will occur to one skilled in the art upon employment of the invention in practice.

A preferred embodiment of the invention has been chosen for the purpose of illustration and description. The preferred embodiment illustrated is not intended to be exhaustive nor to limit the invention to the precise form shown. The preferred embodiment is chosen and described in order to best explain the principles of the invention and their application and practical use to thereby enable others skilled in the art to best utilize the invention in various embodiments and modifications as are best adapted to the particular use contemplated.

DETAILED DESCRIPTION OF THE INVENTION

The present invention relates to an indirectly-fired turbine system which employs a high temperature heat exchanger for indirectly heating the compressed air to be expanded through a expansion device such as the gas turbine and which utilizes water injection for evaporatively cooling a stream of compressed air heated by the heat of compression before the stream of compressed air enters the high temperature heat exchanger. The evaporative cooling of the compressed air stream is by adiabatic evaporation of the water in the air. This cooling of the compressed air at the cold inlet of the heat exchanger effectively reduces the hot exit or outlet temperatures of the heat exchanger. By so reducing the heat exchanger outlet temperature heat rejection is reduced. Thus, under the First Law of Thermodynamics for a heat engine where the net work is equal to the heat input less heat rejection and parasitic heat losses, the reduction in heat rejection results in more net work for the same heat input. Such an increase in net work provides the heat engine with a higher operating efficiency and higher specific work output. The increased mass due to the presence of the water in the heated air stream also provides an increase in net power.

By utilizing a high temperature air heater or heat exchanger which is capable of heating the compressed air to a turbine inlet temperature greater than about 1,000° C., preferably about 1,100° to 1,260° C., the regenerative, indirectly-fired turbine system can achieve a cycle efficiency comparable to the best direct cycle, natural gas-fired systems presently available. By employing water injection as provided by the present invention, in such an indirect cycle system it is possible to achieve efficiencies and specific power output in a basic system without a steam bottoming cycle that favorably compare to those obtainable in a natural gas-fired combined cycle.

Figure 1:
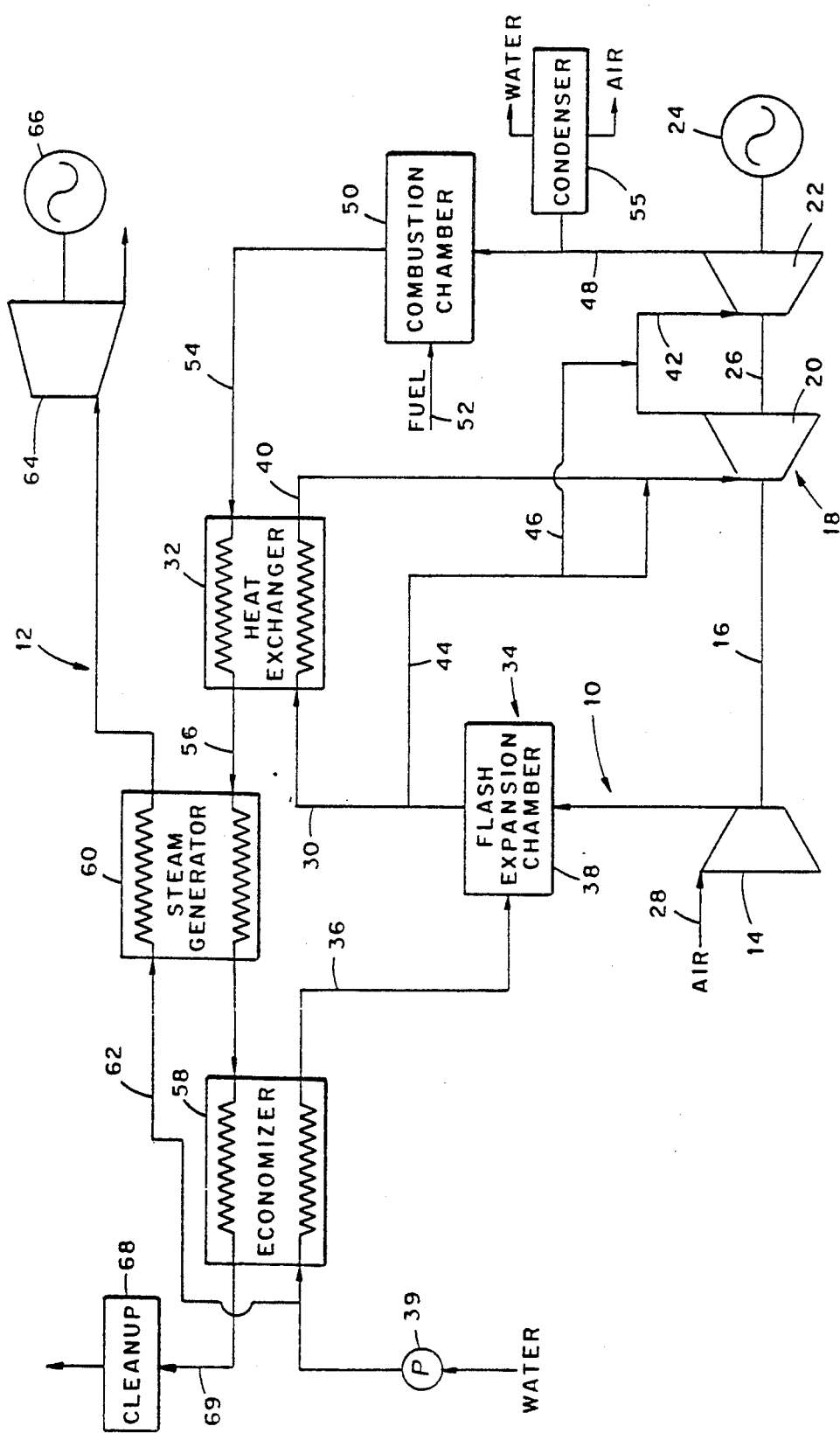
FIG. 1 is a schematic diagram illustrating the water-augmented indirectly-fired gas turbine system of the present invention including an optional steam bottoming cycle.
Figure 2:
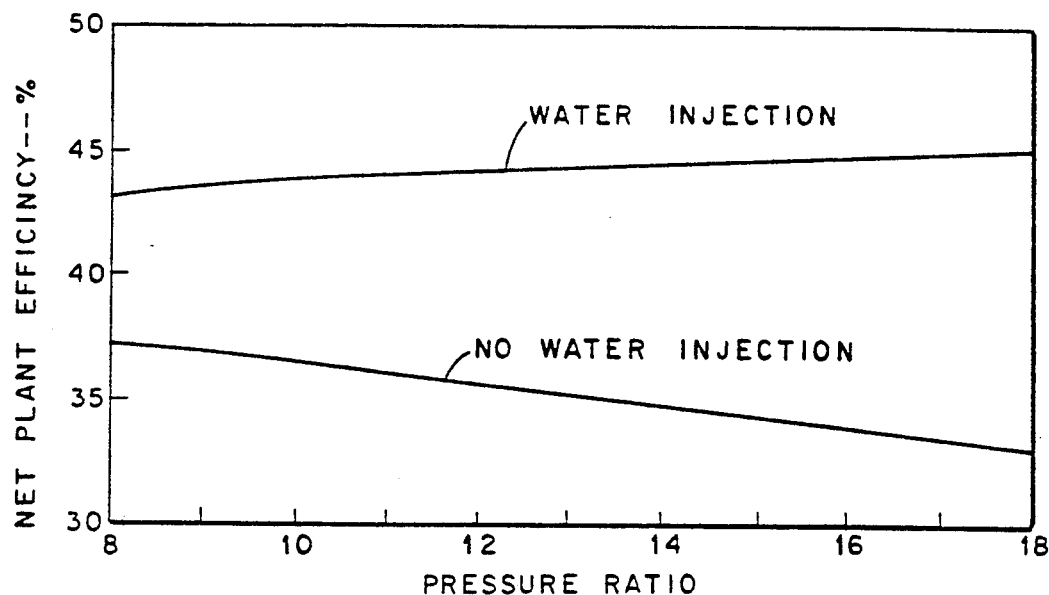
FIG. 2 is a graph comparing over a wide range of pressure ratios the overall cycle efficiency of a basic indirect-cycle turbine system without water injection with a basic indirect-cycle system with water injection, the comparisons being made at a turbine inlet temperature of 1,260° C. and air cooling by water injection to a temperature of 6° C. above adiabatic saturation temperature for the air.
Figure 3:
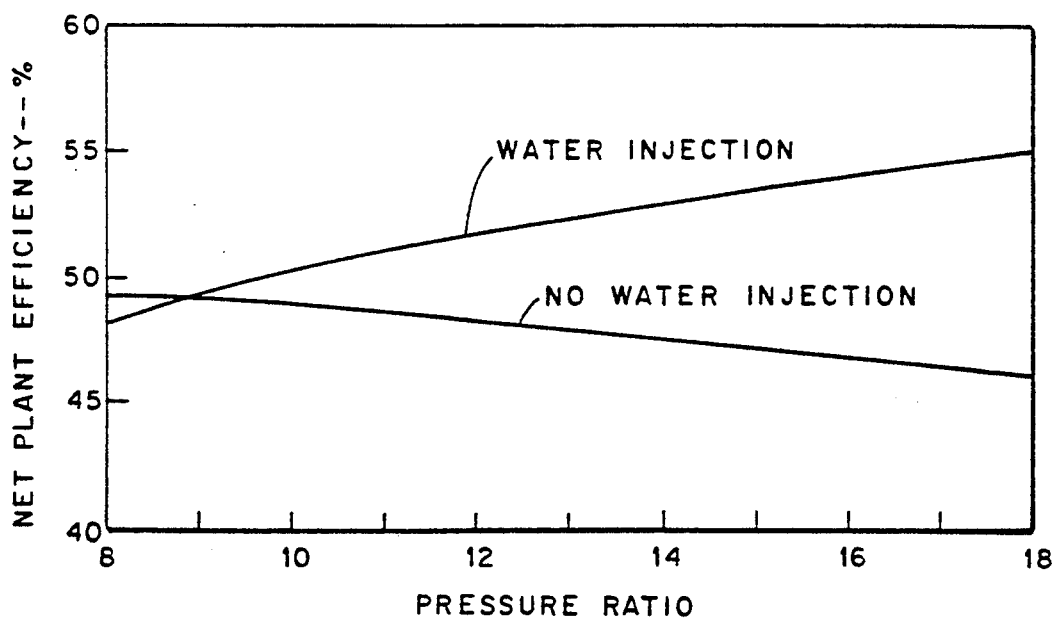
FIG. 3 is a graph comparing over a wide range of pressure ratios the net output in Kj/Kg of inlet air for the basic indirect cycle turbine systems such as compared in the graph of FIG. 2.
Figure 4:
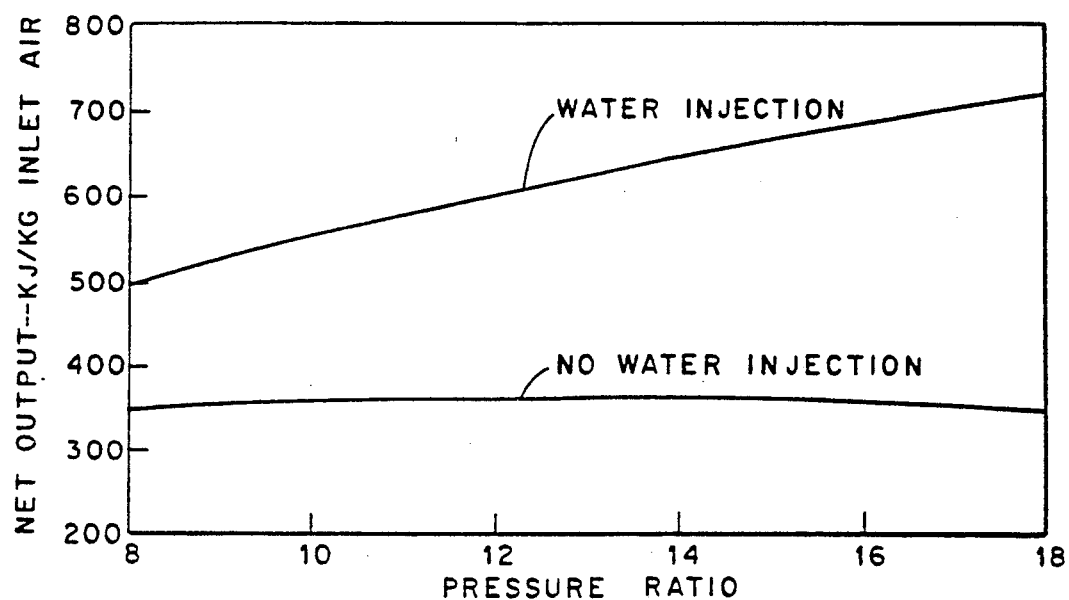
FIG. 4 is a graph comparing the efficiencies of combined indirect cycle systems over a wide range of pressure ratios and using operating parameters as in FIG. 2.
Figure 5:
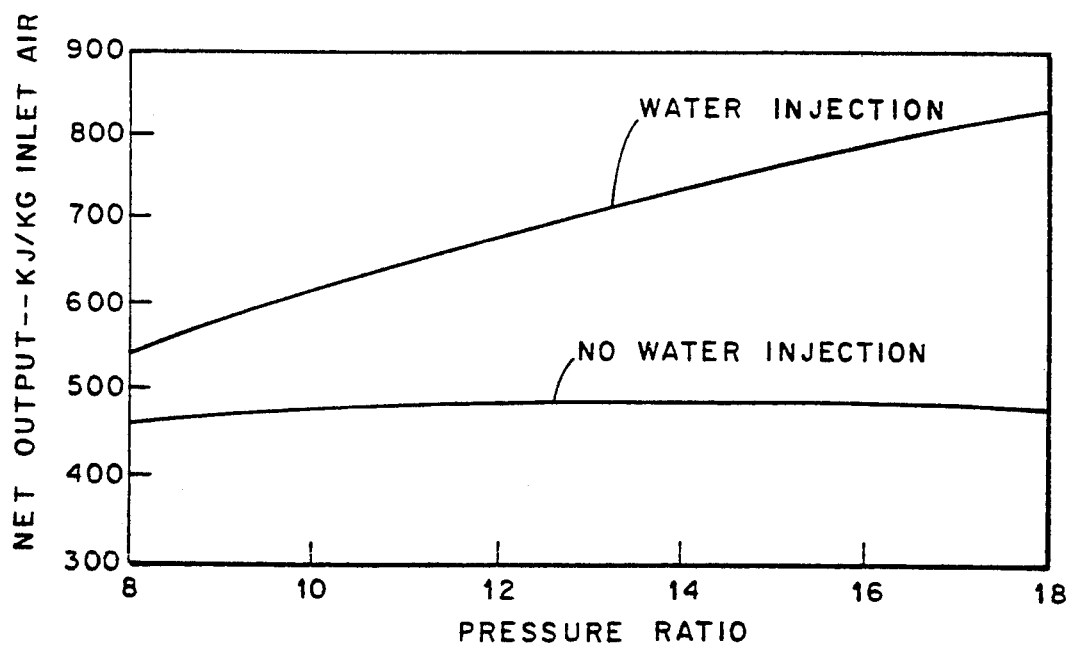
FIG. 5 is a graph similar to FIG. 3 but comparing the net output of combined indirect cycle systems over a wide range of pressure ratios.

With reference to FIG. 1 of the drawings, an indirectly-fired gas turbine system is generally shown at 10. The system 10 is provided with an optional steam bottoming plant generally shown at 12 which can be added to the basic turbine system to provide a combined system with enhanced efficiency. The basic gas turbine system, apart from the steam bottoming plant 12, comprises an axial flow air compressor 14 which is shown coupled by a drive shaft 16 to a expansion mechanism 18 provided by a high-pressure turbine 20 and a low pressure turbine 22. A load such as an electrical generator 24 is shown coupled to the turbines 20 and 22 by a shaft 26.

Air at ambient pressure and temperature is introduced through line 28 into the inlet in the compressor 14 and compressed to a pressure in the range of about 4 to 20 times ambient pressure. During this compression of the air, the heat of compression heats the air to a temperature in the range of about 300° to 400° C. The heated, compressed air is discharged from the compressor 14 through line 30 which is coupled to the high pressure, low temperature side of a high temperature air heater or heat exchanger 32. A water adding or injection station 34 is disposed in the line 30 at a location intermediate the compressor 14 and the heat exchanger 32. Water from line 36 is injected into the compressed air stream in line 30 to adiabatically cool the compressed air by evaporation to a temperature less than that of the air discharged from the compressor 14 so as to provide a higher driving temperature difference across the heat exchanger 32. By so cooling the compressed air, a lower outlet temperature for the air heating medium is provided at the heat exchanger 32 to decrease the level of heat rejection in the heat exchanger 32 and thereby increase the net efficiency of the system.

Water is preferably added to the air stream in line 30 by employing a flash-type expansion chamber as generally shown at 38. The water is pressurized by a suitable pump mechanism generally shown at 39 to a pressure at least as great as the compressed air in line 30 so that the water can be injected into the compressed air stream at the water injection station 34. The volume of water added to this air stream may vary from a relatively small amount which will be effective for adequately cooling the air to realize a gain in cycle efficiency to a volume where the water is injected at super saturated conditions to provide maximum air cooling and maximum increases in cycle efficiency. The super saturated water cools the air to a temperature slightly above the adiabatic saturation temperature for the air. The compressed water-containing air is indirectly heated in the heat exchanger to a turbine inlet temperature greater than 1,000° C. This heated air is then conveyed through line 40 to the inlet of the high temperature turbine 20 for expansion therethrough. The discharge stream from the high pressure turbine is introduced into the low pressure turbine 22 through line 42. As briefly mentioned above, these turbines are used for driving the compressor 14 and the power consuming load such as the generator 24.

The compressed water-containing air in the line 30 downstream of the water injection station 34 is relatively cool as compared to the temperature of the compressed air discharged from the compressor. A portion of this cool, water-containing air can be used to provide for turbine cooling. Since this moisturized air is substantially cooler than the air discharged from the compressor, the air usually used for turbine cooling, a smaller flow rate of moisturized air is required for cooling of turbine components. This lower flow rate reduces the parasitic loss due to turbine cooling and thus increases the net output and cycle efficiency. This turbine cooling air and leakage flow from the heat exchanger may be bled off from the conduit 30 at a location between the water injection station 34 and the heat exchanger 32 and passed through suitable conduits such as shown at 44 and 46 to the inlets of turbines 20 and 22, respectively.

The heat exchanger 32 utilized with the present invention is of the type which is capable of indirectly heating a compressed air stream to a turbine inlet temperature greater than about 1,000° C., preferably to a temperature in the range of about 1,100° to 1,260° C., for providing the desired cycle efficiencies as achieved by the water addition of the present invention. A suitable heat exchanger for such air heating purposes can be of the type described in the aforementioned U.S. patent. The construction of the particular heat exchanger employed is not part of the present invention but it must be of a type which will provide for the indirect heating of the compressed air to the desired temperature.

In order to provide the hot gas stream required for indirectly heating the compressed air in the heat exchanger 32 to a selected temperature greater than about 1,000° C., the water-saturated air discharged from the low temperature turbine 22, which retains some residual heat values, is conveyed through line 48 to a combustion chamber 50 where a suitable fuel conveyed through line 52 is burned in the presence of the hot water-saturated air from the low pressure turbine 22 to provide a stream of hot combustion gases. This stream of hot combustion gases is discharged from the combustion chamber through conduit 54 and passed through the heat exchanger 32 to indirectly heat the compressed water-containing air to the desired temperature.

The volume of water-containing air discharged from the turbine 22 through line 48 may be in excess of that required for providing the hot combustion gases needed in the heat exchanger 32 for heating the compressed water-containing air to the desired temperature. A portion of this water-containing air in line 48 representing such excess air may be removed from line 48 and conveyed to a suitable condenser 55 where the water is removed from the air stream.

The particular fuel utilized to heat the air in the combustion chamber 50 is not critical to the invention but the invention itself is particularly suitable for the use of a coal fuel whether in the form of coal particulates or fuel gas. The hot gases discharged from the combustion chamber do not contact the turbine components in an indirect cycle arrangement and can be readily cleansed for environmental discharge downstream of the heat exchanger 32 and other heat extracting mechanisms which may be used in the turbine system. Residual heat values in the combustion gases discharged from the heat exchanger 32 through line 56 can be recovered in the basic indirectly-fired turbine system in an economizer 58 which is used to preheat the high pressure water in line 36 to a temperature in a range of about 200° to 280° C. The preheating of the water is advantageous since it facilitates the injection of the water into the air stream under super saturated conditions so as to cool the air to a temperature slightly above the adiabatic saturated temperature for the air.

Also, if desired and as shown in FIG. 1, a steam bottoming cycle 12 may be used to further increase the efficiency of the basic water-augmented indirect cycle of the present invention. In a steam bottoming cycle, a steam generator 60 is placed in line 56 upstream of the economizer 58. High pressure water in line 62 such as from the pump 39 passes through the steam generator 60 to convert the water to steam for driving a steamturbine 64 coupled to a suitable load such as a generator 66.

The stream of water-saturated combustion gases after passing through the steam generator 60 and the economizer 58, can be introduced into a suitable cleanup system generally shown at 68 through line 69. In such a cleanup system, a surface condenser located downstream of a baghouse utilized to remove particulate contaminates could be used to extract excess water from combustion gases to provide a convenient source of washdown water for a scrubber used to clean the combustion gases for environmental discharge. In such an arrangement, the gas stream entering the scrubber will be water-saturated so that essentially no evaporation of the water will occur in the scrubber. Also, since the demister water can be readily condensed upstream of the scrubber, there will be relatively little clean water demand for the scrubber. Lower scrubber demand for clean water will partly compensate for the volume of clean water required by the water injection system.

In a typical operation of a water injected indirectly-fired gas turbine system such as generally shown in FIG. 1, but without the steam bottoming plant 12, the operating parameters pertaining to mass flow, temperatures, and pressures at various stages are expected to be as set forth below. The inlet air temperature and pressure of each kilogram of air at the inlet to the compressor 14 is about 15° C. and at ambient pressure or 0.100 Mpa. At the discharge end of the compressor 14, the air is compressed to a pressure ratio of approximately 13.5:1 (13.5 times ambient pressure) or 1.368 Mpa and is heated by the heat of compression to a temperature of approximately 355° C. Sufficient water is injected at the water injection station 34 in a super saturated condition to adiabatically cool the air to a saturation temperature of 144° C. which is 6° C. above the adiabatic temperature of the water. By so cooling the air, the mass flow of the air is increased from 1.0 kilogram per kilogram of inlet air (Kg/Kg) to 1.205 Kg/Kg while the air pressure is slightly decreased to 1.341 Mpa. With the turbine cooling by-pass circuit employed as by bleeding air through lines 44 and 46 the mass flow will be further decreased to 1.097 Kg/Kg. The water saturated air in line 30 is then passed into the heat exchanger 32 where it is heated to a temperature of 1,292° C. to provide a turbine inlet temperature of 1,260° C. at a pressure of 1.314 Mpa and a mass flow of 1.137 Kg/Kg of inlet air. After expansion of the heated air through the high pressure turbine 20, the mass flow is increased to 1.193 Kg/Kg of inlet air while the temperature and pressure are respectively decreased to 1,033° C. and 0.710 Mpa. After expansion through the low pressure turbine 22, the temperature of the air is decreased to 593° C. and the pressure is decreased to a pressure slightly greater than atmospheric pressure or 0.107 Mpa. This stream of water-saturated air discharged from the low pressure turbine 22 is conveyed into the combustion chamber 50 where a fuel such as coal is combusted in the presence of this air to provide a stream of gaseous combustion products at a temperature of 1,429° C. and a mass flow to 1.263 Kg/Kg of inlet air while maintaining the pressure of the gaseous combustion products at substantially atmospheric pressure. The heat exchanger 32 extracts a substantial amount of heat from these combustion products for indirectly heating the compressed water containing air so that the temperature of combustion gases leaving the heat exchanger 32 through line 56 is at a temperature of 576° C. The temperature of the combustion gases in line 56 is further decreased to about 462° C. in the economizer 58 as required for heating the water while at a pressure of 13.79 Mpa and a mass flow of 0.192 Kg/Kg inlet air in line 36 to a temperature of 260° C. for facilitating the evaporative saturation of the air in line 30.

In the above operation, the compressed air in line 30 is cooled by the added water to a temperature of 144° C. which is 6° above the ambient saturation temperature of the air. To accomplish this cooling, a water injection rate of 0.192 Kg of water per Kg of dry air is required. To provide this amount of water evaporation, the water is injected under super saturated conditions which are provided by the water being at a pressure of 13.79 Mpa and at a temperature of 260° C. before entering the water injection station 34. This volume of water injection is within limits accomplished for a steam injected direct-fired cycle without a steam bottoming cycle. However, with a steam bottoming cycle the temperature of the water injected into the compressed air stream in line 30 will be slightly less since the water heated in the economizer 58 will only be heated to about 180° C. due to the steam generator 60 extracting a substantial percentage of the heat remaining in the gas stream discharged from the heat exchanger 32.

With the steam bottoming cycle 12 in place, the temperatures, pressures, and mass flows of the air and combustion gases are expected to be slightly less than those in the basic system due to the heat extraction in the steam generator 60 of the steam bottoming cycle. For example, the water introduced into the steam generator 60 through line 62 is preferably pressurized to a value similar to that of the water introduced through line 36 into the economizer 58 and is heated from a temperature of 205° C. to 482° C. for producing steam which is introduced into the steam turbine where the steam is expanded and the temperature is decreased to a temperature slightly greater than ambient while the pressure is decreased to 0.006 Mpa.

The above operation is merely illustrative of a typical indirect cycle employing the water injection features of the present invention, and the operating parameters set forth can vary considerably from those used above without departing from the spirit and scope of the present invention.

The water injection feature of the present invention is responsible for a significant increase in net system efficiency and net power. As shown in FIGS. 2-5, the performance of an indirectly-fired basic system and an indirectly-fired combined system, both without water injection, are used for comparisons with a water augmented basic system and a combined system provided in accordance with the present invention. In each of these figures, the compressed air at the turbine inlet is at a temperature of 1,260° C. and compressed air in line 30 is water cooled to about 6° above the adiabatic net saturation temperature of the compressed air. In these figures, the net plant efficiency is in percent and the net specific output is in Kj/Kg of inlet air. As shown in FIGS. 2–5, three general operational trends are of interest. Firstly, water injection produces significantly higher net plant efficiency and net specific output in both the basic and the steam bottoming cycles. Secondly, the efficiency of the indirect cycles without water injection decreases with increasing pressure ratios while the net output remains essentially unchanged. Thirdly, both the net efficiency and the net output of the water injected cycle increase with increasing pressure ratios. The higher net efficiency and net output are directly associated with increases in the rate of water injection as the pressure ratio increases. Thus, at the higher pressure ratios there is a higher compressor discharge temperature which allows for the evaporation of more water for achieving a selected air temperature approaching the saturation temperature of the pressed air.

It will be seen that the present invention provides a novel approach to increasing the efficiency and output of indirectly-fired gas turbine systems. By injecting water into the compressor discharge air stream, the water evaporatively cools the air stream before it enters the indirect heat exchanger to reduce heat rejection therein and thereby provide an increase in the net efficiency of the system. Also, the water injection provides a considerable increase in power output due to the added mass flow and higher specific heat. The water-injected indirect cycle has a higher efficiency and power output over pressure ratios in the range of about 4.14:1 to about 20:1 than achievable in previously known gas turbine systems employing indirectly-fired and directly-fired cycles.

What is claimed is:

1. An indirectly-fired gas turbine system comprising, compressor means for compressing air to a selected pressure during which heat is added to the pressurized air, heat exchange means adapted to receive a stream of pressurized air from the compressor means and indirectly heat the received air to a selected temperature, flash evaporation means for introducing sufficient water into the stream of pressurized air prior to the reception thereof in the heat exchange means for substantially saturating the pressurized air to evaporatively cool the pressurized air to a temperature slightly above the adiabatic saturation temperature for the pressurized air, turbine means adapted to receive a stream of hot pressurized water-containing air from the heat exchange means, combustion means adapted to receive water-containing air discharged from the turbine means, water condensing means adapted to receive a portion of the water-containing air discharged from the turbine means prior to the reception of the balance of the water-containing air in said combustion means, means for providing the combustion means with a combustible fuel for the combustion thereof in presence of the air from the turbine means to provide a stream of hot combustion gases, and means for conveying the stream of hot combustion gased to said heat exchange means for indirectly heating the pressurized water-containing air to said selected temperature.

2. An indirectly-fired gas turbine system as claimed in claim 1, wherein the combustion gases are at a temperature in the heat exchange means sufficient to heat the pressurized water-containing air to a temperature greater than about 1,000° C. prior to the reception thereof in the turbine means.

3. An indirectly-fired gas turbine system as claimed in claim 1, wherein further heat exchange means are adapted to receive combustion gases from the first mentioned heat exchange means, and wherein the water is heated in said further heat exchange means prior to the introduction of the water into the pressurized air stream.

4. An indirectly-fired gas turbine system as claimed in claim 1, wherein conduit means couple the compressor means to the heat exchange means for conveying said stream of pressurized air from said compressor means to said heat exchange means, and wherein said flash evaporation means for introducing water into the stream of pressurized air are disposed in said conduit means at a location intermediate said compressor means and said heat exchange means.

5. An indirectly-fired gas turbine system as claimed in claim 1, including steam turbine means, steam generating means adapted to receive combustion gases from the heat exchange means, means for conveying water to said steam generating means for the generation of steam therein by heat exchange with the combustion gases received in the steam generating means, and means for conveying steam from the steam generating means into said steam turbine means.

6. A method for operating an indirectly-fired gas turbine system, comprising the steps of compressing air to a selected pressure during which heat is added to the compressed air by the heat of compression, adding sufficient water to a stream of the compressed air by flash evaporation to super saturate the air for evaporatively cooling the compressed air to a temperature slightly above the adiabatic temperature for the compressed air, conveying a portion of the stream of evaporatively cooled water-containing compressed air to the turbine means for cooling components of the latter, indirectly heating the balance of the stream of the compressed water-containing air to a temperature greater than about 1,000° C., conveying a stream of the heated water-containing compressed air into turbine means for driving said turbine means, heating a stream of water-containing air discharged from the turbine means to a temperature greater than that provided to the stream of compressed water-containing air during the indirect heating step, and using the heated stream of water-containing air for the step of indirectly heating the stream of the compressed water-containing air to said temperature greater than about 1,000° C.

7. The method claimed in claim 6, wherein the temperature greater than about 1,000° C. is a temperature in the range of about 1,100° to 1,260° C.

8. The method claimed in claim 6, including the additional steps of pressurizing and heating the water prior to adding the water to the stream of compressed air to a pressure and temperature sufficient to super saturate the stream of compressed air.

9. The method claimed in claim 6, wherein the air is compressed to a pressure in the range of about 4 to 20 atmospheres, and wherein the air is heated during the compression thereof to a temperature in the range of about 300° C. to 400° C.

10. A method for operating an indirectly-fired gas turbine system, comprising the steps of compressing air to a selected pressure during which heat is added to the compressed air by the heat of compression, adding sufficient water to a stream of the compressed air by flash evaporation to super saturate the air for evaporatively cooling the compressed air to a temperature slightly above the adiabatic temperature for the compressed air, indirectly heating the stream of the compressed water-containing air to a temperature greater than about 1,000° C., conveying a stream of the heated water-containing compressed air into turbine means for driving said turbine means, conveying a portion of the stream of water-containing air from the turbine means to condensing means for removing water therefrom, heating the balance of the stream of water-containing air discharged from the turbine means to a temperature greater than that provided to the stream of compressed water-containing air during the indirect heating step, and using the heated stream of water-containing air for the step of indirectly heating the stream of the compressed water-containing air to said temperature greater than about 1,000° C.

* * * * *